United States Patent Office 3,554,933
Patented Jan. 12, 1971

3,554,933
DYEABLE FOAMED POLYPROPYLENE
Charles F. Grainger, Charlotte, N.C., assignor to Celanese Corporation, New York, N.Y., a corporation of Delaware
No Drawing. Filed Apr. 3, 1967, Ser. No. 627,666
Int. Cl. C08j 1/14; C08f 47/10; C08d 13/08
U.S. Cl. 260—2.5                                6 Claims

ABSTRACT OF THE DISCLOSURE

A process for the preparation of dye site containing foamed polyolefin shaped articles and the products produced thereby, the process involving blending a blowing agent which a hot melt of the polyolefin prior to formation of the shaped article, the blowing agent comprising the reaction product of a thermally degradable acid and a polyamide.

---

This invention relates to dyeable polymeric shaped articles produced by processes employing foaming agents, and more specifically to dyeable polypropylene shaped articles wherein in the the process of manufacture, foaming is accomplished by means of a gas releasing thermally degradable organic compound.

Hydrocarbon polymers, particularly the paraffinic ones, are difficult to dye as they lack any functional groups to which dye molecules may become attached. It is known that dye receptive additives, particularly various nitrogen-based polymers may be added to non-dye receptive paraffinic polymers in order to improve their dyeability. Many of these nitrogen-based polymers, however are incompatible with the paraffinic polymers or they may also be difficult to handle by reason of their viscosity. In addition to the aforementioned difficulties in producing a dyeable paraffinic polymer, it is readily apparent that the addition of dye receptive additives which require extensive blending operations or additional processing operations will vastly increase the cost of the preparation of the end product.

Polymeric shaped articles produced by processes employing foaming agents include low density shaped articles, that is to say, shaped articles having a high bulk to weight ratio as well as fibrillated products wherein a foaming agent is employed in the fibrillation process. The low density shaped articles produced with processes employing foaming agents are disclosed in U.S. Pat. No. 3,214,234. The patented process involves the extrusion of a molten mixture of a normally solid resin or polymer together with a foaming agent which is gaseous at the temperature of the mixture during extrusion, through a small orifice and then drawing. The resultant product has a substantially lower bulk to weight ratio than correspondingly unfoamed materials.

Fibrillated products wherein a foaming agent is employed in the fibrillation process is a very recent development. The fibrillation of extruded polymeric materials has recently attracted the attention of the textile industry, because in comparison wih polymers extruded by spinnerette methods to form filament yarn, tow, staple and monofilament, the extrusion of extrudates which can be subsequently subjected to fibrillation techniques results in higher production rates and lower cost of equipment. Polyolefins and especially polypropylene resins have been found to be especially satisfactory for fibrillation techniques.

The aforementioned polypropylene shaped articles produced by processes employing foaming agents are all deficient in dye receptivity. However, due to low cost being a prime factor for the acceptance of these producs, processes which materially affect the cost of manufacture, even though improving dyeability, are of limited commercial feasibility.

It is a further object of this invention to provide, in a means of a foaming process, a polyolefin shaped article having enhanced dyeability.

It is an additional object of this invention to produce a foam fibrillated polyolefin having enhanced dyeability.

It is another object of this invention to produce a low density polyolefin of enhanced dyeability.

It is a further object of thisinvention to provide, in a process employing foaming agents to produce shaped articles, a single compound which will both foam the polyolefin and enhance the dye receptivity of the polyolefin.

In accordance with this invention, it has now been discovered that a foamed polyolefin extrudate of enhanced dyeability may be obtained by incorporating in the polyolefin a minor amount of the reaction product of the thermally degradable acid and a dye site producing agent. Preferably, the thermally degrading acid is a dicarboxylic acid and the dye site producing compound is a polyamide.

The polyamide reactant employed herein is the polyamide of a dimer acid as herein defined or an alkyl ester thereof, with a polyamine of the formula

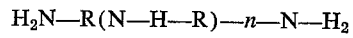

where R is an alkylene radical having from 2 to 6 carbon atoms and $n$ is O or J. It should be understood that the polyamide reactant has free amine groups which are capable of undergoing additional reactions.

The dimer acid is preferably a polymeric fat acid. The term "polymeric fat acids" as used herein is intended to be generic to polymerized acids obtained from "fat acids." The term "fat acids" is intended to include saturated, ethylenically unsaturated and acetylenically unsaturated, naturally occurring and synthetic monobasic aliphatic acids, containing from 8 to 24 carbon atoms. A more detailed description of the polymeric fat acids may be found in British Pat. No. 1,013,960 published Dec. 22, 1965.

The polyamines employed to react with the previously described polymeric fat acids are the alkylene diamine or triamines which may be defined by the formula

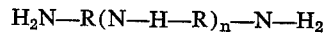

where R is an alkylene radical having from 2 to 6 carbon atoms and $n$ is O to 1. Illustrative of polybasic amines are ethylene diamine; di-ethylene triamine; hexamethylene diamine; di-1,3-propane triamine and di-1,2-propane triamine. Thus, the alkylene radical in the above formula is generally ethylene, but should not be limited thereto as alkylene groups having up to 6 carbon atoms may be employed.

The thermally degradable acid employed in this invention is a thermally degradable acid which preferably decomposes at temperatures below the decomposition temperature of the polyolefin extrudate. The thermally degradable acid should, on decomposition, leave little or no residue and produce polymer blowing components such as $CO$, $CO_2$, $H_2$ and $H_2O$. Preferably, the thermally degradable acid is a dicarboxylic acid which has closely adjacent carboxyl groups and still more preferably, from 0 to 3 carbon atoms should separate the carboxyl groups. Specific thermally degradable acids which have been found suitable for purposes of this invention are tartaric acid, carbonic acid, formic acid, critic acid, oxalic acid, malonic acid and glutaric acid. The most preferred of the foregoing acids is oxalic acid. It should be understood that salts such as ammonium salts of any of the previously defined acids are also deemed to be included within the broad definition of thermally degradable acid.

It should be understood that the dimer acid and the polyamine may be reacted prior to addition of the thermally degradable acid or alternatively, the three components consisting of the polymeric fat acid, the polyamine and the thermally degradable acid may be reacted simultaneously. In general, the reactions may be carried out at temperatures of from about 100° C. to 300° C. for periods of about three hours.

The thermally degradable acid should be present in quantities of from about 0.1% to 5% by weight based on total solids weight of the blend prior to extrusion. The polyamide produced from the reaction of the dimer acid and the polyamine should be present in quantities of from about 0.1% to 5% by weight based on the total solids weight of the blend prior to extrusion.

The dye site producing blowing agent is preferably incorporated in the polyolefin together with an amorphous polymeric material which serves as a swelling agent for the polyolefin. Swelling the polyolefin renders dye sites disposed therein more accessible to dyestuffs. Preferably the amorphous polymeric material is a polyvinyl compound and still more preferably a polyvinyl alcohol such as for instance, Elvax 40 (high molecular weight vinyl resin manufactured by E. I. du Pont de Nemours & Co.). The amorphous polymeric swelling agent is added to the polyolefin in quantities of from about 0.1% to 5% based on total solids weight of the blend prior to extrusion.

The following specific examples of the preparation of the dye site containing blowing agent of this invention are given for purposes of illustration and should not be considered as limiting.

EXAMPLE I 400 ml. of distilled water containing one gram Duponol ME (an emulsifier consisting mainly of sodium lauryl sulfate, manufactured by E. I. du Pont de Nemours & Co.) are charged into a Waring Blendor of 1000 ml. capacity. 200 ml. of benzene containing 13.7 grams (0.05 eq.) of distilled dimer diamine derived from dimerized fat acids is then added to the Waring Blendor. The mixture is stirred and 5.3 grams (0.05 mole) of $Na_2CO_3$ is added with additional stirring. To the resulting dispersion is added almost all at once a solution of 5.08 grams (0.05 eq.) of terephthaloyl chloride in 150 ml. of benzene. This mixture is stirred rapidly for 2-3 minutes and then stripped free of benzene which breaks the emulsion and causes the polyamide to granulate. The granules are removed by filtration, washed with hot water until the wash water is free of Cl and then dried under water-pump vacuum at 75° C. until a constant weight is obtained. Three parts of the thus prepared polyamide is dissolved in methanol. One part of malonic acid dissolved in methanol is then added to the polyamide reaction product producing a slurry of reaction product in the methanol. Five parts of DuPont "Elvax 40" (high molecular weight vinyl resin manufactured by E. I. du Pont de Nemours & Co.) is added thereto and the slurry is then dried by allowing the methanol to evaporate. Polypropylene pellets (Profax 6823 marketed by Hercules Co.) are then loaded into a National Rubber Machinery extruder equipped with a 12" long screw 1" in diameter. One percent by weight based on total solids weight of the oxalic acid polyamide reaction product is then added thereto. The extruder is then brought up to 210° C. and the hot-melt produced thereby is then forced through a one-inch extruder at a rate of 100 pounds per hour. The die-head is maintained at a temperature of 240° C. and is designed so as to produce a film 4 inches wide and 20 mils thick. The hot-melt is extruded into a water quenching bath, the die-head being disposed 10" above the surface of the water. The extrudate, upon contacting water is cooled to a temperature below the glass transition temperature of polypropylene and is then passed under a snubbing pin disposed beneath the surface of the water in order to attenuate air voids in the extrudate. The extrudate is then withdrawn from the water quenching bath and passed over a series of godet wheels at a takeup speed of 200 meters per minute whereby the polypropylene is drawn and oriented. The oriented material is then led around a series of pins which are exposed so as to force the extrudate to travel through a tortuous path and thereby induce fibrillation. The fibrillated yarn produced thereby is woven into fabrics and subjected to dyeing trial, using disperse acid, 1:1 premetallized and 1:2 premetallized dyes, the yarns, in all cases, showing a more pronounced affinity for the deystuff than did a polypropylene yarn control which contained conventional blowing agents.

EXAMPLE II

The procedure of Example I for the preparation of the reaction product of a polyamide and dicarboxylic acid is again repeated with the exception that oxalic acid is employed in place of the malonic acid 2% by weight of the oxalic acid-polyamide reaction product is blended with polypropylene pellets (Profax 6823 marketed by Hercules Co.) heated to a temperature of 220° C. and extruded through a 37 mil orifice into a filament. The extruded filament quenched to a temperature below the glass transition temperature of the polymer, is then continuously drawn at a 6½:1 ratio. When the resultant product is compared with a polypropylene yarn control which contained conventional blowing agents, it is found that the product containing the blowing agents of this invention exhibit enhanced dyeability when subjected to disperse acid 1:1 permetallized and 1:2 premetallized dyes.

EXAMPLE III

The procedure of Example I for the preparation of the reaction product of a polyamide and dicarboxylic acid is again repeated with the exception that oxalic acid is employed in place of the malonic acid and a commercially available amide Versamide No. 15 (amide manufactured by General Mills Corp.) is employed. Polypropylene pellets (Profax 6823 marketed by Hercules Co.) are then loaded into a National Rubber Machinery extruder equipped with a 12" long screw, 1" in diameter. Four percent by weight based on total solids weight of the oxalic acid-polyamide reaction product is then added thereto. The extruder is brought up to 210° C. and the hot-melt produced thereby is then forced through a one inch extruder at a rate of 100 pounds per hour. The die is designed so as to produce a film 4 inches wide and 20 mils thick. The die is equipped with a 500 watt electric band heater and the die-head is maintained at a temperature of 235° C. The extruded sheet is maintained at temperatures above the glass transition temperature by means of an accurately regulated air curtain. The extruded film is passed over first roll at a speed of 30 meters per minute. At this point, the fibrillated product is obtained which is in a substantialy undrawn, unoriented condition. The undrawn, unoriented fibrillated polypropylene material is then subjected to a drawing operation, the drawing operation being carried out by passage over a shoe heated to 130° C. and then taking the yarn over a roll having a winding speed about 60 meters per minute, thereby producing a draw ratio $$\frac{\text{second roll speed}}{\text{first roll speed}}$$

of 3.5.

1200 denier yarn prepared according to the procedure set forth in Example III is knitted into a fabric on a V-bed flat knitting machine. A similar control fabric is prepared which is identical in all respects except that the 1200 denier yarn is prepared using oxalic acid alone without the presence of a polyamide. Evaluations of the improvement in dyeability are then made for disperse dyes, acid dyes, 1:1 premetallized acid dyes and 1:2 premetallized acid dyes, the exact dye baths and dyeing procedures being as follows:

DISPERSE DYE (1) To cold bath, liquor ratio 30/1, add:
   1% Triton X-100 (surfactant manufactured by Rohm & Haas).
   1% soda ash (pH 9.0-10.0).
(2) Raise temperature to 180° F. and scour 20 minutes.
(3) Rinse clear.
(4) To fresh, cold bath, add:
   0.1% Versene Fe-3 specific (sequestering agent manufactured by Dow Chemical Co.).
   Treat 5 minutes.
   Add:
   2% diammonium phosphate.
   Treat 5 minutes.
   Add:
   0.5% Lyogen WD (Levelling agent or dye assistant manufactured by Sandoz).
   Treat 5 minutes.
(5) Add:
   2% Eastman Blue BNN (Disperse Blue 3) (CI 61505) (Disperse dye manufactured by Eastman Chemical Co.) Pre-dissolved in water at 160° F. with some Triton X-100 (surfactant manufactured by Rohm & Haas).
(6) Run for 10 minutes. Raise temperature slowly to 200-210° F. Dye for 45 minutes.
(7) Cool with water to 160° F. Drop bath and rinse clear.
(8) Scour with 0.5% soap flakes at 160° F. for 20 minutes.
(9) Rinse clear; extract and dry.

ACID DYE (1) To cold bath, liquor ratio 30/1, add:
   1% Nylofixau P (fixing agent manufactured by Sandoz).
   Treat 10 minutes.
   Add:
   0.1% Versene Fe-3 specific (sequestering agent manufactured by Dow Chemical Co.).
   Add:
   1% acetic acid (glacial), pH 5.0.
(2) Treat 5 minutes and add:
   1% Alizarin Light Blue 2A (Acid Blue 25) (acid dye manufactured by Sandoz), previously dissolved in water, with Triton X-100 (surfactant manufactured by Rohm & Haas) at boil.
(3) Treat 5 minutes and raise temperature to 200° F. Dye 15 minutes.
(4) Add 2% acetic acid (pH 4.0) and dye for 45 minutes.
(5) Cool with water to 160° F. and drop bath. Rinse clear.
(6) Afterscour the same as with disperse dyes.

1:2 PREMETALLIZED DYE (1) To cold bath, liquor ratio 30/1, add:
   1% Nylofixau P (fixing agent manufactured by Sandoz).
   Treat 10 minutes.
   Add:
   0.1% Versene Fe-3 specific (sequestering agent manufactured by Dow Chemical Company).
   Add:
   1% acetic acid (glacial), pH 5.0.
(2) Treat 5 minutes and add:
   1% Cibalan Blue BL (acid dye manufactured by Ciba) previously dissolved in water, with Triton X-100 (surfactant manufactured by Rohm & Haas) at boil.
(3) Treat 5 minutes and raise temperature to 200° F. Dye 15 minutes.
(4) Add 2% acetic acid (ph 4.0) and dye for 45 minutes.
(5) Cool with water to 160° F. and drop bath. Rinse clear.
(6) Afterscour the same as with disperse dyes.

1:1 PREMETALLIZED DYE (1) To cold bath, liquor ratio 30/1, add:
   1% Nylofixau P (fixing agent manufactured by Sandoz).
   Treat 10 minutes.
   Add:
   0.1% Versene Fe-3 specific (sequestering agent manufactured by Dow Chemical Company) and 3% formic acid, pH 3.0—3.5.
   Treat 5 minutes.
(2) Add:
   1% Neolan Navy Blue RL (acid dye manufactured by Ciba) previously dissolved in water, with Triton X-100 (surfactant manufactured by Rohm & Haas) at boil.
(3) Treat 5 minutes and raise temperature slowly to 200° F. Dye 30 minutes.
(4) Cool to 160° F. with water, drop bath and rinse clear.
(5) Afterscour same as disperse dyeing.

Sample swatches dyed according to the four aforementioned systems were then given a complete chromaticity analysis, using a Hunter Color Meter manufactured by Henry A. Gardner Laboratory, Inc., 4723 Elm St., Bethesda 14, Md. Three values are obtained for each sample swatch which are recorded as L (measure of brightness wherein 100=perfect white and 0=perfect black); $a$ (measure of green and red values wherein negative values are green and positive values are red); $b$ (measure of yellow and blue values wherein positive values are yellow and negative values are blue)

| Samle | L value | a value | b value |
|---|---|---|---|
| Example III, disperse dyed | 37 | +3.7 | −26.0 |
| Control disperse dyed | 53 | 0 | −26.4 |
| Example III, acid dyed | 44 | +1.0 | −30.0 |
| Control acid dyed | 79 | −1.2 | −2.6 |
| Example III, 1:2 premetallized dyed | 30 | +0.2 | −10.0 |
| Control, 1:2 premetallized dyed | 71 | +0.8 | −5.0 |
| Example III, 1:1 premetallized dyed | 39 | +5.1 | −12.5 |
| Control, 1:1 premetallized dyed | 76 | +2.8 | −1.9 |

As can be seen from the table, the samples which have had a polyamide incorporated in the thermally degradable blowing agent exhibit a vastly stronger coloration than the control which does not have a polyamide present. The polyamide containing products are not only dyed more deeply, but are uniformly dyed due to the uniform distribution of polyamide achieved by driving the polyamide through out the polyolefin by means of the thermally degradable acid blowing agent.

While in general, any of the well-known disperse dyes, acid dyes, 1:2 premetallized dyes and 1:1 premetallized dyes are suitable for use with the polyolefin foamed according to the process of this invention, disperse dyes which have been found to be especially suitable are Eastman Blue BNN (C.I. 61505), Latyl Blue BG, Eastone Fast Red NGLF. Acid dyes which have been found to be especially suitable are Alizarin Light Blue 2A, Nylomine Blue AG, Nylomine Yellow AG, Nylomine Red A-2B. 1:2 premetallized dyes which have been found to be especially suitable are Cibalan Blue BL and Cibalan Yellow 2 BRL. 1:1 premetallized dyes which have been found to especially suitable are Neolan Navy Blue RL and Neonyl Brilliant Blue 3 BLF.

Having thus disclosed the invention, what is claimed is:

1. A process for the preparation of a dyesite containing shaped article of a polymer of a mono-alpha-olefin of 2 to 4 carbon atoms, said process comprising blending of a blowing agent with a hot melt of said polymer prior to formation of said shaped article, said blowing agent comprising the reaction product of a thermally degardable acid which decomposes at temperatures below the decomposition temperature of said olefin and a polyamide prepared by reacting a dimer fat acid with a polyamine of the formula $H_2\text{—}N\text{—}R(N\text{—}H\text{—}R)_n\text{—}N\text{—}H_2$ where R is an alkylene radical having from 2 to 6 carbon atoms and $n$ is 0 to 1.

2. The process of claim 1 wherein said thermally degradable acid is an acid selected from the group consisting of tartaric acid, carbonic acid, formic acid, citric acid, oxalic acid, malonic acid and glutaric acid.

3. The process of claim 1 wherein said thermally degradable acid is a dicarboxylic acid wherein not more than 3 carbon atoms separate the carboxyl groups.

4. The process of claim 1 wherein said polymer of a mono-alpha-olefin is polypropylene.

5. The process of claim 1 wherein said extrudate is extruded through a film forming dye, said extrudate being maintained at a temperature above the glass transition temperatuer and attenuated to produce fibrillation.

6. The process of claim 1 wherein said extrudate is extruded through a filament forming dye, cooled to a temperature below the glass transition temperature of the extrudate and drawn to produce a low density dye receptive filament.

References Cited

UNITED STATES PATENTS

| | | | |
|---|---|---|---|
| 3,097,991 | 7/1963 | Miller et al. | 162—157 |
| 3,275,587 | 9/1966 | Weller et al. | 260—2.5EP |
| 3,320,187 | 5/1967 | Burt | 260—2.5EP |
| 3,405,516 | 10/1968 | Laureti | 57—144 |
| 3,326,826 | 6/1967 | Cohen | 260—857OL |
| 3,359,344 | 12/1967 | Fukushima | 260—857OL |
| 3,391,125 | 7/1968 | Van Mourik et al. | 260—2.5N |
| 3,277,029 | 10/1966 | Chadwick et al. | 260—2.5N |

SAMUEL H. BLECH, Primary Examiner

M. FOELAK, Assistant Examiner

U.S. Cl. X.R.

260—857, 23; 264—176, 54; 8—180